Jan. 14, 1936. E. H. EDEN 2,027,373
DENTAL APPLIANCE
Filed Jan. 10, 1934  2 Sheets-Sheet 2

Edward Henry Eden
INVENTOR

BY Victor J. Evans
and Co, ATTORNEY

Jan. 14, 1936.　　　　E. H. EDEN　　　　2,027,373

DENTAL APPLIANCE

Filed Jan. 10, 1934　　　2 Sheets-Sheet 1

Edward Henry Eden
INVENTOR

BY Victor J. Evans
and Co. ATTORNEY

Patented Jan. 14, 1936

2,027,373

UNITED STATES PATENT OFFICE 2,027,373

DENTAL APPLIANCE

Edward H. Eden, St. Louis, Mo.

Application January 10, 1934, Serial No. 706,126

5 Claims. (Cl. 32—19)

This invention relates to a dental device and a method to secure jaw relations and records for the construction and adjustment of artificial dentures, whereby the completed dentures or the upper and lower teeth thereof will properly coordinate and permit a person to easily masticate food with natural jaw movements and obviate the possibility of the dentures tipping or tilting while masticating the food which would otherwise cause irritation of the gums and other parts of the mouth.

Another object of this invention is the provision of means whereby a person's various jaw relations or positions may be accurately obtained and these positions held while a record check bite is made of each position, providing records to be employed for accurately adjusting the condyle paths of an articulator in accordance with the jaw relations of the person.

With these and other objects in view this invention consists in certain novel features of construction, combination and arrangement of parts to be hereinafter more fully described and claimed.

For a complete understanding of my invention, reference is to be had to the following description and accompanying drawings, in which Figure 1 is a plan view illustrating an upper trial plate with the stylus secured thereto.

Figure 9:
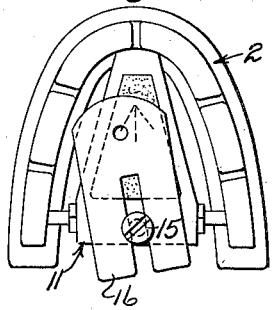
Figure 9 is a plan view illustrating the holding plate shown by Figure 7 applied to the recording plate of the lower trial plate and adjusted to the Gothic arch on said recording plate for a right lateral occlusion.

Referring in detail to the drawings, the numerals 1 and 2 indicate upper and lower trial plates having bite rims 3 and 4. The method of constructing the trial plate will be hereinafter more fully described and the bite rims 3 and 4 are provided with notches or grooves 5. The vault 5' of the upper trial plate 1 carries a stylus 6 consisting of an internally screw threaded sleeve 7 secured to the vault 5' and to which is threaded a stylus pin 8 capable of being locked in various adjusted positions by a lock nut 9 threaded to the pin and adapted to be turned against the sleeve 7. The scribing point of the stylus pin is indicated by the character 10. The stylus 6 operates in conjunction with a recording plate 11 carried by the bite rim 4 of the lower trial plate 2. The recording plate is of substantially triangular shape, with threaded ears at the base to receive threaded studs 12, to be adjusted to the width of the lower bite rim 4. The studs 12 are locked with lock nuts 13. The apex and the studs are heated and embedded in the bite rim 4 to secure the recording plate to the bite rim of the lower trial plate, it being understood that the recording plate after being once adjusted remains fixed with respect to the bite rim during the construction of the denture. A suitable recording material 14 is applied to the upper face of the recording plate and may be in the form of a soft dark colored wax. The recording plate also carries a set screw 15 for adjustably securing to said recording plate either of the holding plates 16 or 17, shown in Figures 7 and 8 of the drawings. The plates 16 and 17 have slots 18 to receive the set screw; while one end of the plate 17 is provided with a V-shaped notch 20, the holding plate 16 has an aperture 19. The use to which these plates 16 and 17 are placed is approximately the same, as will be hereinafter more fully described.

The purpose of the stylus and the recording plate is to permit the forming of a Gothic arch in the tracing material 14, as shown in Figures 2, 9 to 11 and 13, which arch consists of the lines A, B and C. The Gothic arch represents the protrusive occlusion, left and right lateral occlusions and also the centric occlusion of a person's or patient's lower jaw. The method of obtaining this Gothic arch and its use will be hereinafter more fully set forth.

Figure 12:
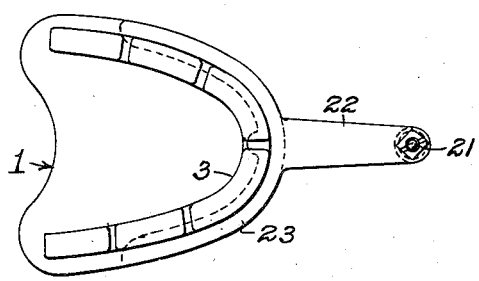
Figure 12 is a plan view illustrating an upper trial plate with a modified form of stylus applied thereto.
Figure 13:
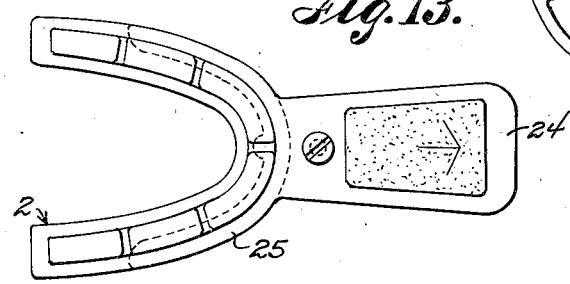
Figure 13 is a plan view illustrating the lower trial plate with a modified form of recording plate applied thereto.
Figure 14:
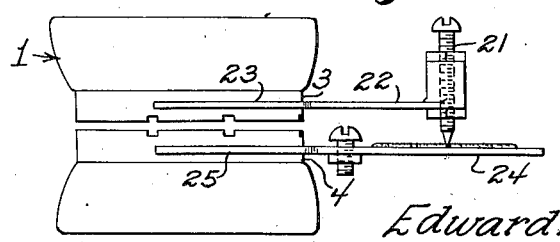
Figure 14 is a side elevation illustrating the upper and lower trial plates with the stylus and recording plate applied thereto and of a construction as disclosed in Figures 12 and 13.
Figure 1:
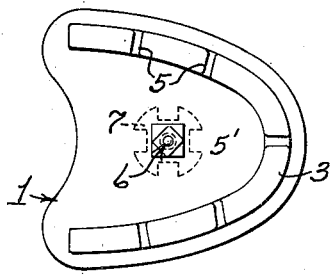
Figure 2:
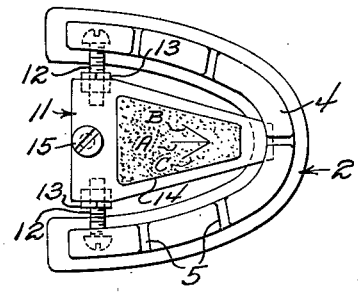
Figure 2 is a plan view illustrating a lower trial plate with a recording plate secured thereto.
Figure 3:
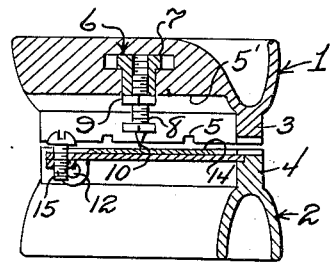
Figure 3 is a sectional view illustrating the upper and lower trial plates associated for bringing the stylus in engagement with the recording plate.
Figure 4:
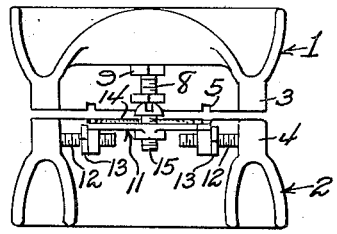
Figure 4 is a rear elevation illustrating the same.

Sometimes it is desirable that the forming of the Gothic arch take place in view or exteriorly of the person's or patient's mouth and to accomplish this my modified form of stylus and recording plate, shown in Figures 12 to 14 is employed. The stylus 21 is carried by an arm 22 and is adjustable relative thereto and the arm is integral with a fork 23 adapted to fit within a channel formed in the outer face of the bite rim 3 of the upper trial plate 1. The recording plate 24, used in conjunction with the stylus 21 is constructed similarly to the recording plate 11 except that it is formed integrally with a fork 25 adapted to fit within a channel in the outer face of the bite rim 4 of the lower trial plate 2. The stylus forms the Gothic arch in the tracing material of the recording plate 24 in the same manner as my preferred form of invention. However, the dentist or operator may readily view the movement of the recording plate relative to the stylus at all times due to the fact that these parts are located exteriorly of the mouth of the patient.

Figure 5:
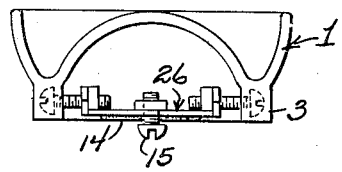
Figure 5 is a rear elevation illustrating the application of a recording plate to the upper trial plate.
Figure 6:
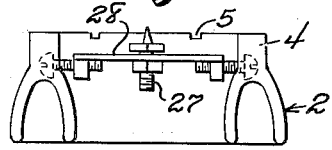
Figure 6 is a rear elevation illustrating the securing of the stylus to the lower trial plate.

As shown in Figures 5 and 6 the stylus and recording plate are reversely arranged on the trial plates from that shown in Figures 1 to 4, inclusive. The recording plate is indicated by the character 26 and is shown as adjustably secured to the upper trial plate 1, the tracing material being positioned on the lower face of the recording plate. The stylus is indicated by the reference character 27 which is adjustably secured to a bridge 28 and the latter is adjustably secured to the lower trial plate 2.

Figure 15:
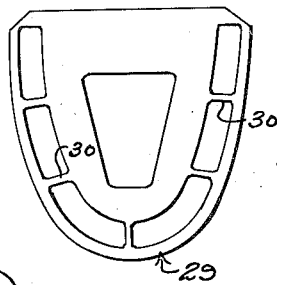
Figure 15 is a plan view illustrating a record check bite.

In Figure 15 there is shown a record check bite 29 constructed of wax or any other suitable material. In the use of my invention in constructing a set of artificial dentures there will be made four record check bites, one giving the centric occlusion, the second the protrusive occlusion, the third the left lateral occlusion and the fourth the right lateral occlusion of the patient's lower jaw. These record check bites each will have formed therein ribs 30 to fit in the grooves 5 of the bite rims, the purpose of which is to prevent any one of the record check bites from moving relative to the bite rims while in use. The different occlusions as before described will be impressed on the record check bites thereby giving the dentist a record to go by in the construction of the artificial denture.

The method in which my invention is employed for the construction of artificial dentures so as to have the advantages stipulated is as follows:

First, plastic impressions (not shown) are made of the upper and lower jaws of the patient and are treated in the usual manner to provide casts or models which are exact reproductions of the patient's jaws.

Second, base plates of suitable dental material are adapted to the upper and lower casts or models to form the upper and lower trial plates 1 and 2.

Third, wax or other suitable material is built up on the trial plates to form bite rims 3 and 4.

Fourth, the upper trial plate is placed in the patient's mouth, that is, upon the gums of the upper jaw and the bite rim thereof is trimmed to the length and shape for the appearance of the patient and then removed from the patient's mouth and placed on the upper cast or model, and the stylus 6 is secured to the vault 5' thereof. The bite rim 3 is then cut to form the notches or grooves 5.

Fifth, the upper and lower trial plates 1 and 2 are placed in the mouth of the patient and the bite rim of the lower trial plate 2 is trimmed so as to provide a space between the upper and lower bite rims.

Sixth, the trial plates 1 and 2 are removed from the patient's mouth and the lower trial plate is placed on the cast and the recording plate 11 is attached to the bite rim thereof and the latter is cut to form the grooves or notches 5.

Seventh, the trial plates are placed into the patient's mouth and the stylus is turned in or out relative to the sleeve 7 until the proper vertical dimension of the patient's face is secured when the mouth is closed, it being understood that the point 10 of the stylus contacts with the recording plate when the mouth is closed.

Eighth, the trial plates are removed from the mouth of the patient and the stylus locked by adjusting the nut 9 against the sleeve 7 and the tracing material 14 is applied to the recording plate.

Ninth, the trial plates are placed in the patient's mouth and the patient instructed to close the jaws, bringing the stylus into engagement with the recording plate indicating in the tracing material a marking forming a part of the Gothic arch and which marking is one end of the line A and indicates the centric occlusion of the patient's jaws. The patient is then instructed to move the lower jaw forward and backward forming the line A in the tracing material which indicates the protrusive occlusion of the jaw. The patient is then instructed to move the lower jaw laterally or sideways forming the line B in the tracing material by the stylus indicating the right lateral occlusion of the jaws. The patient is then instructed to move the jaw laterally in an opposite direction, forming in the tracing material the line C by the stylus which indicates the left lateral occlusion of the jaws. The dentist now has on the recording plate the Gothic arch giving the centric occlusion, protrusive occlusion and the left and right lateral occlusions of the patient's lower jaw.

Figure 10:
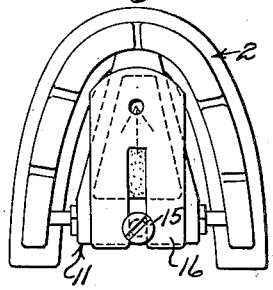
Figure 10 is a similar view showing the holding plate adjusted for a centric occlusion.
Figure 7:
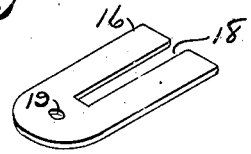
Figure 7 is a perspective view illustrating a holding plate.
Figure 8:
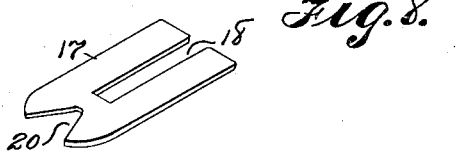
Figure 8 is a perspective view illustrating a modified form of holding plate.

Tenth, the lower trial plate is removed from the patient's mouth and the holding plate 16 or 17, as shown in Figures 7 and 8 of the drawings, is secured to the recording plate by the set screw 15 and if employing the holding plate 16, the aperture 19 is adjusted to the Gothic arch so that the aperture aligns with the apex of the Gothic arch, as shown in Figure 10. The lower trial plate is again positioned in the patient's mouth and the patient instructed to move the jaws until the stylus drops into the aperture. Soft wax or similar material is positioned between the bite rims and the patient instructed to bite upon said material forming the latter into a record check bite similar to that shown in Figure 15 and which will give the centric occlusion record. This record check bite also has formed therein the ribs 30 by the notches or grooves 5 of the bite rims so that after the removal of the record check bite and when it is desired to again place the record check bite between the bite rims it will be properly positioned with respect to the bite rims by the ribs 30 fitting in the grooves or notches 5.

Figure 11:
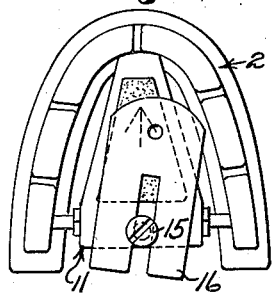
Figure 11 is a similar view showing the holding plate adjusted for a left lateral occlusion in a direction opposite to that shown in Figure 9.

Record check bites giving the left and right lateral occlusions of the patient's jaw are formed in the same manner except that the holding plate is adjusted into the positions, as shown in Figures 9 and 11. The record check bite of the protrusive occlusion is made by adjusting the aperture of the holding plate to any position on the line A, ⅛ inch or more back of the apex of the Gothic arch and the heretofore described method of forming the check bite is carried out. The dentist now has at his disposal record check bites giving the centric occlusion, protrusive occlusion, and right and left lateral occlusions of the patient's jaws and if a face bow is used, the fork thereof is heated and embedded into the upper bite rim to obtain the relation of the trial plates to the condyle head of the jaw bones, so that the trial plates and casts are held in the same relative position, anterior-posterior, laterally and vertically on the articulator until the casts are attached to the mounting plates of said articulator with plaster of Paris. If no face bow is used, the trial plates are sealed to the casts with sticky wax and the centric check bite is placed between the bite rims and sealed with sticky wax. The casts are then mounted on the mounting plates of any adjustable articulator. The other check bites heretofore mentioned are used to adjust the condyle paths of the articulator.

Eleventh, when the face bow is used the upper and lower trial plates are sealed to the upper and lower casts with sticky wax and the centric check bite is placed between the bite rims and sealed thereto with sticky wax. The face bow is adjusted to any adjustable articulator and the upper and lower casts are attached to the upper and lower mounting plates of the articulator with plaster of Paris. The face bow is now removed from the articulator and the bite rims. The vertical dimension of the articulator is retained by adjusting and locking a means provided on the articulator for that purpose. The centric check bite is now removed from between the bite rims of the upper and lower trial plates, and the protrusive check is placed between the said bite rims. The condyle paths, (left and right) of the articulator are now adjusted; if the right lateral check bite is placed between the bite rims the left condyle path is adjusted; if the left lateral check bite is placed between the bite rims the right condyle path is adjusted.

The articulator by this method is adjusted to have the exact movements of the lower jaw of the patient.

Twelfth, the lower bite rim is built up to meet the upper bite rim. Artificial teeth are now sealed to the upper trial plate by removing a small amount of the bite rim thereof and placing one tooth at a time in position so that said teeth come in contact with the built up bite rim of the lower trial plate, the teeth being set to the proper length for esthetics and phonetics. The lower teeth are sealed to the lower trial plate and are articulated to function when the articulator is moved to any position. The trial plates having the teeth mounted thereto are tried in the patient's mouth to determine if they properly articulate and if found to be correct, the trial plates are sealed to the casts and finished with rubber or one of the other denture base materials well known to the art thereby completing the dentures ready for use by the patient.

From the heretofore described method it will be seen that a dentist can easily and quickly construct artificial dentures wherein the teeth thereof properly coordinate in accordance with the movements of the lower jaw of the patient and when used by the patient in masticating food the dentures will be prevented from tilting or tipping and permit the patient to easily masticate food with practically no discomforts.

It is to be understood that the holding plate 17 having the notch 20 is employed in the same manner as the holding plate 16 except that the notch 20 is adjusted to the various lines of the Gothic arch and that when the stylus has moved into the notch of the holding plate by the patient's movements of the jaw, the trial plates will then be in their correct positions so that the various record check bites will be accurately made except it is not possible to make a protrusive check bite with a holding plate of this character.

Having described the invention, I claim:

1. In combination with trial plates fitted to a person's jaws and including bite rims, an element secured to one of the trial plates and adapted to have recorded thereon a marking indicating the centric different occlusions of the person's lower jaw, a second element secured to the other trial plate, and means cooperating with said elements and adjustable to various positions relative to the marking for guiding the person's jaws into positions in accordance with the determined occlusions of the jaws for the forming of record check bites between said bite rims.

2. In combination with trial plates fitted to a person's jaws and including bite rims, an element secured to one of the trial plates and adapted to have recorded thereon a marking indicating the centric protrusive, right and left lateral occlusions of a person's lower jaw, a second element secured to the other trial plate, and means cooperating with said elements and adjustable to the various positions relative to said marking for guiding the person's jaw in accordance with the positions of the determined occlusions of the jaw for the forming of record check bites between said bite rims.

3. In combination with trial plates fitted to a person's jaws and including bite rims, means adjustably secured to one of the trial plates, a second means adjustably secured to the other trial plate and cooperating with the first means in recording a marking indicating different occlusions of the person's lower jaw, and a third means adjustably secured to the second means and adapted to be adjusted to various positions relative to said marking and cooperating with the first means in guiding the person's jaws into positions in accordance with the determined occlusions of the jaws for the forming of record check bites between said bite rims.

4. In combination with trial plates fitted to a person's jaws and including bite rims, a stylus adjustably secured to one of the trial plates, a recording plate adjustably secured to the other trial plate, a tracing material carried by one face of said recording plate and adapted to have formed therein a marking by said stylus to indicate different occlusions of the person's lower jaw, and means adjustably secured to the recording plate and adapted to be adjusted into various positions relative to said marking for guiding and holding the person's jaws into positions in accordance with the determined occlusions of the jaws for the forming of record check bites between said bite rims.

5. In combination with trial plates fitted to a person's jaws and including bite rims, a stylus adjustably secured to one of the trial plates, a recording plate adjustably secured to the other trial plate, a tracing material carried by one face of said recording plate and adapted to have formed therein a marking by said stylus to indicate different occlusions of the person's lower jaw, and a holding plate adjustably secured to the recording plate and adapted to be adjusted in various positions relative to the marking for guiding and holding a person's jaws into positions in accordance with the determined occlusions of the jaws for the forming of record check bites between said bite rims.

EDWARD H. EDEN.